US011028289B2

(12) United States Patent
Waid et al.

(10) Patent No.: US 11,028,289 B2
(45) Date of Patent: Jun. 8, 2021

(54) ADHESIVE ARTICLE WITH A BARRIER LAYER

(71) Applicant: 3M INNOVATIVE PROPERTIES COMPANY, St. Paul, MN (US)

(72) Inventors: Robert D. Waid, Maplewood, MN (US); Scott R. Meyer, Woodbury, MN (US); Panu K. Zoller, River Falls, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 346 days.

(21) Appl. No.: 15/529,310

(22) PCT Filed: Dec. 14, 2015

(86) PCT No.: PCT/US2015/065437
§ 371 (c)(1),
(2) Date: May 24, 2017

(87) PCT Pub. No.: WO2016/100153
PCT Pub. Date: Jun. 23, 2016

(65) Prior Publication Data
US 2018/0334592 A1    Nov. 22, 2018

Related U.S. Application Data

(60) Provisional application No. 62/092,363, filed on Dec. 16, 2014.

(51) Int. Cl.
C09J 7/20       (2018.01)
B32B 27/32      (2006.01)
(Continued)

(52) U.S. Cl.
CPC .................... *C09J 7/20* (2018.01);
*B32B 7/12* (2013.01); *B32B 25/042* (2013.01);
*B32B 27/08* (2013.01);
(Continued)

(58) Field of Classification Search
CPC ............ C08J 7/20; B32B 7/12; B32B 25/042
See application file for complete search history.

(56) References Cited

U.S. PATENT DOCUMENTS

RE24,906 E     12/1960  Ulrich
3,389,827 A     6/1968  Abere
(Continued)

FOREIGN PATENT DOCUMENTS

JP    61-138540    8/1986
JP    10-279892    10/1998
(Continued)

OTHER PUBLICATIONS

Brandrup, Polymer Handbook, (1999) 15pgs.
International Search Report for PCT International Application No. PCT/US2015/065437, dated Jul. 21, 2016, 7pgs.

*Primary Examiner* — Chinessa T. Golden
(74) *Attorney, Agent, or Firm* — Carlos M. Téllez Rodriquez; 3M Innovative Properties Company

(57) ABSTRACT

Provided are adhesive articles that include a barrier layer that is substantially impermeable to oxygen gas at ambient temperature and pressure along with a heat-bondable layer, which could be a discrete layer adjacent to the barrier layer or integral with the barrier layer. The adhesive article further includes a backing extending across and coupled to the barrier layer and an adhesive layer extending across and coupled to the backing opposite the barrier layer. The barrier layer reduces or eliminates migration of plasticizers from the
(Continued)

bonded seal into the adhesive article, limiting deterioration of tape performance over time.

9 Claims, 2 Drawing Sheets

(51) Int. Cl.

| | |
|---|---|
| *C09J 123/08* | (2006.01) |
| *B32B 27/22* | (2006.01) |
| *B32B 27/08* | (2006.01) |
| *B32B 27/16* | (2006.01) |
| *B32B 27/28* | (2006.01) |
| *B32B 27/30* | (2006.01) |
| *B32B 7/12* | (2006.01) |
| *B32B 25/04* | (2006.01) |
| *B32B 37/02* | (2006.01) |
| *B32B 27/26* | (2006.01) |
| *C09J 151/06* | (2006.01) |

(52) U.S. Cl.
CPC .............. *B32B 27/16* (2013.01); *B32B 27/22* (2013.01); *B32B 27/26* (2013.01); *B32B 27/28* (2013.01); *B32B 27/306* (2013.01); *B32B 27/32* (2013.01); *B32B 37/02* (2013.01); *C09J 123/0815* (2013.01); *C09J 123/0876* (2013.01); *B32B 2307/31* (2013.01); *B32B 2307/7244* (2013.01); *B32B 2405/00* (2013.01); *C09J 151/06* (2013.01)

(56) References Cited

U.S. PATENT DOCUMENTS

| | | | |
|---|---|---|---|
| 4,112,213 | A | 9/1978 | Waldman |
| 4,310,509 | A | 1/1982 | Berglund |
| 4,732,808 | A | 3/1988 | Krampe |
| 4,737,410 | A | 4/1988 | Kantner |
| 5,232,702 | A | 8/1993 | Pfister |
| 5,876,855 | A | 3/1999 | Wong |
| 7,097,853 | B1 | 8/2006 | Garbe |
| 7,217,455 | B2 | 5/2007 | Valdez |
| 2001/0003021 | A1 | 6/2001 | Shepard |
| 2004/0219356 | A1 | 11/2004 | Valdez |
| 2006/0199030 | A1 | 9/2006 | Liang |
| 2007/0264520 | A1 | 11/2007 | Wood |
| 2010/0015423 | A1 | 1/2010 | Schaefer |
| 2013/0236724 | A1 | 9/2013 | Yamamoto |

FOREIGN PATENT DOCUMENTS

| | | |
|---|---|---|
| JP | 2000-508021 | 6/2000 |
| JP | 2011-105834 | 6/2011 |
| WO | WO 2010-056541 | 5/2010 |
| WO | WO 2010-056543 | 5/2010 |
| WO | WO 2011-149865 | 12/2011 |

ADHESIVE ARTICLE WITH A BARRIER LAYER

FIELD OF THE INVENTION

The provided adhesive articles and methods are directed to bonding articles to each other. More particularly, these adhesive articles are heat-bondable to at least one article.

BACKGROUND

Foam tapes are commonly used in industrial sealing applications, such as sealing of automotive door jambs. In a typical application, a seal made from a thermoplastic rubber such as ethylene-propylene-diene-monomer (EPDM) is attached to one face of a double-sided foam tape either by priming the seal with an adhesion promoter, or more preferably, thermally fusing the seal to a heat bondable film adhesive that is pre-applied to one face of the foam tape. Earlier high performance foam tapes were often based on acrylic pressure sensitive adhesive (PSA) and foam technologies; because of their relatively high polarity, these materials displayed at least moderate resistance to permeation by plasticizers. Recent changes in the formulation of paints and other target substrates, however, have resulted in a technology shift toward synthetic block copolymer-based PSAs to achieve improved adhesion to these substrates.

Typical block copolymer-based PSAs contain one or more of thermoplastic elastomers, tackifiers, plasticizers, and minor additives, combined with appropriate crosslinking agents. These compositions have been found empirically to give good performance in most industrial bonding applications and are well accepted.

SUMMARY

Migration of plasticizer components from the bonded rubber seal into the pressure sensitive adhesive (with which they are compatible) can upset the balance of the aforementioned components in the PSA formulation. When overplasticized, these pressure sensitive adhesives tend to soften and show reduced adhesion values to target substrates under normal service conditions. In some cases, the migrating plasticizer can permeate completely through even a thick foam core and compromise any adhesive that may be disposed on the opposite side of the tape from the bonded rubber seal.

Symptoms of plasticizer migration can include abnormally high release values for removing liners from the adhesive after heat-aging the tape-seal construction, easy debonding of the block copolymer based adhesive layers from the acrylic core due to plasticizer buildup at the skin-core interface, cohesive failure of the pressure sensitive adhesive skin layer in peel or shear, and loss of shear resistance and reduced peel adhesion of the pressure sensitive adhesive to the target substrate. These problems become evident upon accelerated testing of bonded rubber seals (typically through heat aging). Without a way of isolating the plasticizer, adhesive performance of these seals can significantly vary after heat-aging.

The problem of plasticizer migration has been dealt with in the past by using some sort of barrier layer, but these solutions have been inadequate. Some prior art constructions, for example, dispose an adhesive layer between the source of the plasticizer and the barrier layer, thus failing to fully protect the tape from the plasticizer. Others incorporate a foam backing with barrier properties, which greatly curtails the freedom to use backings that are plasticizer-permeable, such as compressible open-celled backings.

A description of a typical heat-bondable weatherstrip tape and its method of making may be found in U.S. Pat. No. 7,217,455 (Valdez). In this reference, a single-layer polyolefin-based heat activatable adhesive layer is bonded to an acrylic foam based tape. Various surface treatment methods, such as priming or corona treatment can be employed to ensure a good bond between the polyolefin-based layer and the acrylic foam-based tape. As already described, however, this type of construction often exhibits poor resistance to plasticizer migration from the heat-bonded rubber seal.

Described herein is a solution that uses a foam tape with a heat bondable layer comprised of a multilayer film having an internal barrier to plasticizers. The heat bondable layer can be fused to a thermoplastic elastomer seal for industrial applications, such as automotive applications. The internal barrier layer prevents migration of plasticizer from the bonded rubber seal into the tape, thereby limiting deterioration of tape performance on heat aging. Prevention of plasticizer migration from the rubber seals is an important need in the emerging business of tape-applied, body- and door-mounted seals.

In a first aspect, an adhesive article is provided. The adhesive article comprises: a barrier layer having opposed first and second major surfaces, the barrier layer being substantially impermeable to oxygen gas at ambient temperature and pressure; a heat-bondable layer extending across and coupled to the first major surface of the barrier layer; a backing extending across and coupled to the second major surface of the barrier layer; and an adhesive layer extending across and coupled to the backing opposite the barrier layer.

In a second aspect, an adhesive article is provided, comprising: a barrier layer having opposed first and second major surfaces, wherein the barrier layer is heat-bondable and substantially impermeable to oxygen gas at ambient temperature and pressure; a backing extending across and coupled to the second major surface of the barrier layer; and an adhesive layer extending across and coupled to the backing opposite the barrier layer.

In a third aspect, a method of making an adhesive article is provided, comprising: embedding a barrier layer between a pair of heat-bondable polymeric layers by coextrusion, wherein the barrier film is substantially impermeable to oxygen gas at ambient temperature and pressure; coupling one of the heat-bondable layers to a first major surface of a backing; and coupling an adhesive layer to a second major surface of the backing opposite the first major surface.

DEFINITIONS

Figure 1:
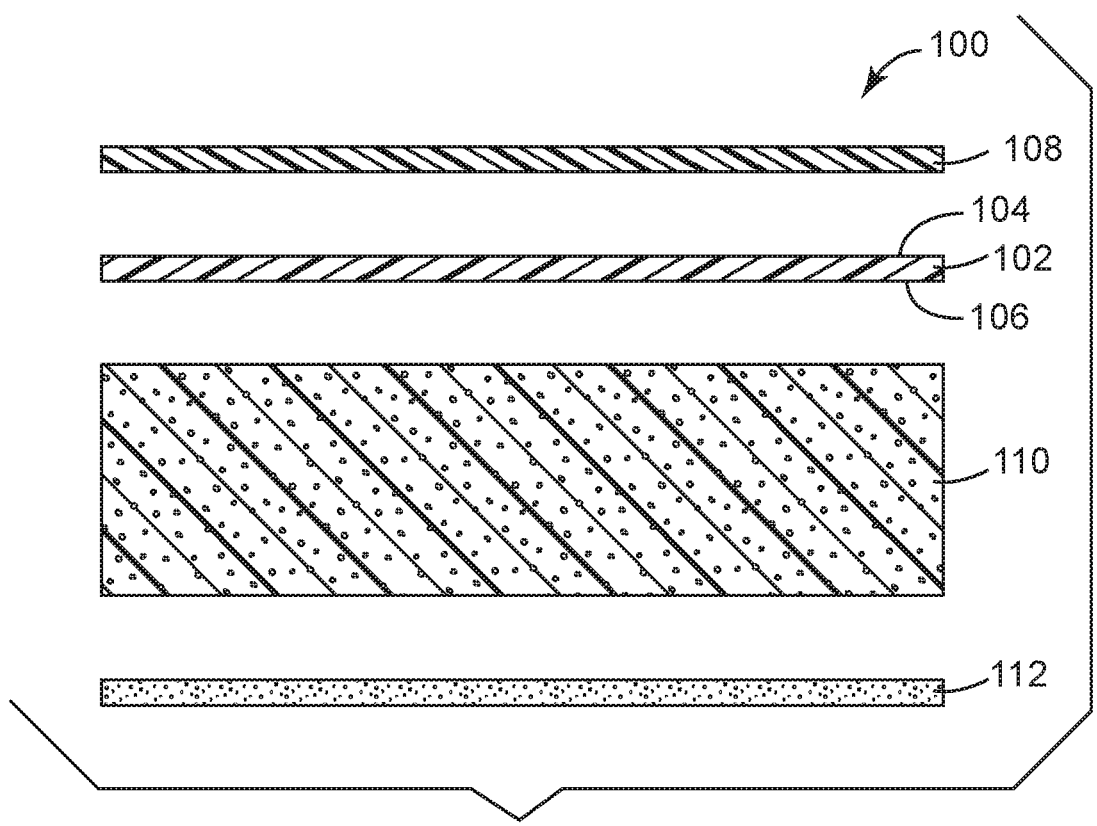
FIG. 1 is an exploded, elevational cross-sectional view of a multi-layered adhesive article according to a first exemplary embodiment.

As used herein:

"Ambient temperature" means 25 degrees Celsius.
"Ambient pressure" means at 1 atmosphere pressure.

DETAILED DESCRIPTION

The adhesive articles are now described by illustration and example with respect to particularized embodiments in the following specification. Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures are not drawn to scale.

FIG. 1 presents an adhesive article according to one exemplary embodiment, designated herein by the numeral 100 and shown in exploded view for clarity. As shown, the adhesive article 100 has a composite configuration that includes a plurality of discrete layers serving various functions. The layers are, in order, a heat-bondable layer 108, a barrier layer 102, a backing 110, and an adhesive layer 112. Each of these layers will be examined more fully in the paragraphs that follow.

A functional element of the adhesive article 100 is the barrier layer 102. In a preferred embodiment, the barrier layer 102 is comprised of a polymer substantially impermeable to oxygen at an ambient temperature and pressure. For example, the polymer preferably exhibits a transmission of oxygen gas ($O_2$) of less than 100 $cc/m^2$/day-atmosphere (hereinafter expressed as "$cc/m^2$/d-atm"), less than 60 $cc/m^2$/d-atm, less than 30 $cc/m^2$/d-atm, less than 15 $cc/m^2$/d-atm, or less than 5 cc-25 $m/m^2$/d-atm, where the transmission measurements are taken at 25° C. and zero percent relative humidity. Experimentally measured values of oxygen transmission can be found, for example, in *Polymer Handbook*, 4$^{th}$ Edition, John Wiley & Sons, Inc. (1999).

Permeability measurements are defined based on a multilayered barrier structure having a standardized barrier layer thickness of 25 micrometers. If $O2$ permeability is determined at other thicknesses, an appropriate linear adjustment of the permeability values can be made based on the thickness of the barrier layer and/or number of barrier layers used. In either case, the values should be normalized to a total barrier layer thickness of 25 micrometers. Values were normalized to standard barrier layer thickness of 25 micrometers by multiplying the oxygen transmission rate value by the ratio of barrier layer thickness to 25 micrometers.

In addition to being substantially impermeable to $O_2$ gas, the barrier layer 102 can also exhibit barrier properties with respect to $CO_2$, $N_2$ and $H_2S$ gases, as well as to small molecules that are capable of migrating through polymeric films, particularly including plasticizers.

Here, oxygen transmission rate (or more broadly, permeability to small molecules) can be an effective proxy for the permeability of a given material to plasticizers commonly found in polymeric substrates, such as automotive bonded rubber seals. Optionally the barrier layer 102 be comprised of a material that is substantially impermeable to a given plasticizer while nonetheless substantially permeable to oxygen (or some other small molecule). In broader embodiments, the adhesive article 100 is bonded to a substrate containing significant amounts of a given plasticizer, where the barrier layer 102 is substantially impermeable to the given plasticizer.

There are no particular restrictions on the materials that can be used in the barrier layer 102. Non-limiting examples of such materials include vinyl alcohol containing polymers, such as ethylene vinyl alcohol copolymer (EVOH) and polyvinyl alcohol (PVOH), polyacrylonitrile, polystyrene, polyester, and nylon, either alone, or blended with each other, or another polymer. Preferably, the barrier layer 102 comprises a vinyl alcohol containing polymer such as EVOH or PVOH, with EVOH being particularly preferred. The barrier layer 102 may preferably be comprised of substantially pure EVOH, most preferably comprising 99% or more EVOH. However, it also contemplated that EVOH could be effectively blended with other polymers, such as ethylene vinyl acetate copolymer, while preserving its barrier properties.

Suitable polymers may also include polar-group-containing polymers that have effective barrier properties, such as ionomers. Ionomers are polymers that have repeat units of both electrically neutral repeating units and a fraction of ionized units, typically less than 15 mole percent, that are covalently bonded to the polymer backbone as pendant moieties. This means that most ionomers are copolymers of the neutral segments and the ionized units. Examples of such materials include polystyrene sulfonate and sulfonated tetrafluoroethylene based fluoropolymer-copolymer (i.e., Nafion).

The barrier layer 102 may optionally be comprised of a polymeric material having increased density to provide enhanced barrier properties. In some embodiments, the polymeric material has a density of at least 1 $g/cm^3$, at least 1.10 $g/cm^3$, at least 1.15 $g/cm^3$, or at least 1.2 $g/cm^3$.

Certain embodiments can use a barrier layer 102 that incorporates a filler that assists in blocking transmission of small molecules. For example, the barrier layer 102 could be comprised of a polymer composite that includes a flake filler preferentially oriented parallel to its major surfaces.

Referring again to FIG. 1, the barrier layer 102 has a first major surface 104 and a second major surface 106 opposed to the first major surface 104. Extending across and contacting the first major surface 104 of the barrier layer 102 is a heat-bondable layer 108. Optionally and in the embodiment shown, the barrier layer 102 and heat-bondable layer 108 are laminated to each other. As will be described later, however, these layers could also be adhesively or mechanically coupled to each other while retaining their respective functions.

The heat-bondable layer 108 has an exposed surface for bonding to a suitable substrate and can include any of a number of suitable heat-bondable materials. As used herein, "heat-bondable" means that the material layer forms a bond to one or more surfaces when heated and that the bond formed can be released upon subsequent heating. As opposed to PSAs, generally, heat-bondable materials have insufficient tack at room temperature to bond to substrates. Unlike thermosetting materials, the bond formed by a heat-bondable material is generally reversible.

Heat-bondable materials are known to those skilled in the art and include any of a number of thermoplastic materials. Suitable heat-bondable materials include fabric bonding films such as those available from 3M Company in St. Paul, Minn., Bemis Associates in Shirley, Mass., Framis Italia in Gaggiano, Italy, and Sealon in Seoul, Korea. Exemplary materials suitable for use as a heat-bondable layer include polyurethanes, polyamides, polyesters, vinyls, ethylene vinyl acetates, and polyolefins such as polyethylene, polypropylene, and blends/copolymers thereof. Particularly suitable materials for the heat-bondable layer 108 include blends and copolymers of linear low density polyethylene (LLDPE) and octene, such as available from Bemis Corporation from Neenah, Wis. In some embodiments, the heat-bondable layer is capable of being melted such that it can flow into substrates such as textiles, non-wovens, and foams while bonding.

In some embodiments the heat-bondable layer can comprise multiple heat-bondable layers. The multiple heat-bondable layers can each comprise the same or different heat-bondable compositions. In some embodiments, the heat-bondable layer can comprise an additional non-adhesive layer depending upon the needs of the intended application. The additional non-adhesive layer can comprise, for example, an elastic layer or a structural layer (e.g., a polymeric film, a foil, or scrim).

Although not illustrated here, it is possible for the barrier layer 102 and the heat-bondable layer 108 to be merged into a single unitary layer. This could simplify the layer configuration of the adhesive article 100 significantly by reducing the 4-layered construction shown in FIGS. 1-2 to a 3-layered construction. In one such example, the barrier layer could be made from a heat-bondable polymer (such as a polyolefin) that is highly loaded with a filler that imparts barrier properties to the layer.

As shown in FIG. 1, the backing 110 extends across and contacts the second major surface 106 of the barrier layer 102. In some embodiments, the backing 110 and barrier layer 102 are secured to each other by a heat lamination process. For example, either or both opposing surfaces of the backing 110 and barrier layer 102 could be at least partially melted and the two layers pressed against each other. In this case, sufficient entanglement of polymer chains at the bonding interface can enable a strong bond.

While there are no particular limitations on the composition or shape of the backing 110, preferred materials for the backing 110 include polymeric foams and polymeric film layers. Representative examples of materials suitable for either a polymeric foam or solid polymeric film layer in the backing of the tape of this invention include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used. A particularly preferred backing material is a crosslinked copolymer comprised of a 95:5 weight ratio of 2-ethylhexyl acrylate:acrylic acid.

Polymeric foam layers for use in the backing of the tapes of the invention generally will have a density of about 2 to about 30 pounds per cubic foot (about 32 to about 481 kg/m3), particularly in tape constructions where the foam can be stretched to facilitate debonding.

Preferred polymeric foam layers in the backing of the provided adhesive articles are comprised of a compressible foam. Such compressible foams may include open-celled or closed-cell foams, although the latter are often preferred for sealing applications. In some embodiments, the compressible foam is a polyolefin foam or an acrylic foam. Suitable polyolefin foams are available under the trade designations VOLEXTRA and VOLARA from Voltek, a division of Sekisui America Corporation of Lawrence, Mass. Foams may be prepared from expandable microspheres that expand with heat during a manufacturing step, or glass bubbles.

Solid polymeric film backings are preferably selected from polyethylene and polypropylene films, with the most preferred materials being linear low density and ultra low density polyethylene films. A preferred polyethylene film is available under the trade designation MAXILENE 200 from Consolidated Thermoplastics Company of Schaumburg, Ill.

The backing may vary in overall thickness so long as it possesses sufficient integrity to be processed and handled, while providing the desired performance with respect to stretching properties for debonding the backing or tape from a given substrate. The specific overall thickness selected for a backing will depend upon the physical properties of the polymeric foam layer or layers and any solid polymeric film layer forming the backing. Where only one polymeric film or foam layer of a multi-layer backing is intended to be stretched to facilitate debonding, that layer should exhibit sufficient physical properties and be of a sufficient thickness to achieve that objective.

The final layer shown in FIG. 1 is the adhesive layer 112, which extends across, and is adhesively coupled to, the adjacent backing 110.

In preferred embodiments, the adhesive layer 112 is a pressure sensitive adhesive layer. The pressure sensitive layer can be derived from a suitable polymer, including for example, acrylates such as those disclosed in U.S. Pat. No. RE 24,906 (Ulrich), U.S. Pat. No. 3,389,827 (Abere et al.), U.S. Pat. No. 4,112,213 (Waldman), U.S. Pat. No. 4,310,509 (Berglund et al.), U.S. Pat. No. 4,732,808 (Krampe et al.), U.S. Pat. No. 4,737,410 (Kantner), U.S. Pat. No. 5,876,855 (Wong et al.), and U.S. Pat. No. 7,097,853 (Garbe et al.); polyisobutylenes; polyisoprenes; styrene block copolymers (e.g., SEBS copolymers, SBS copolymers); and silicones as disclosed in U.S. Pat. No. 5,232,702 (Pfister), and International Patent Application Nos. WO 2010/056541 (Liu et al.) and WO 2010/056543 (Liu et al.).

Acrylic pressure sensitive adhesives generally have glass transition temperatures of about −20° C. or less. Such adhesives may comprise from 80 to 100 weight percent of a C3-C12 alkyl ester component such as, for example, isooctyl acrylate, 2-ethylhexyl acrylate and n-butyl acrylate and from 0 to 20 weight percent of a polar component such as, for example, acrylic acid, methacrylic acid, acrylamide, ethylene vinyl acetate, N-vinylpyrrolidone and styrene macromer. In some embodiments, the acrylic pressure sensitive adhesives comprise from 0 to 20 weight percent of acrylic acid and from 100 to 80 weight percent of isooctyl acrylate. Certain active agents (e.g., CHG) may react with acrylic acid, and pressure sensitive adhesives containing acrylamide or N-vinylpyrrolidone instead of acrylic acid may be desirable in such instances.

Useful pressure sensitive adhesives may include an elastomeric material. Examples of suitable elastomeric materials include linear, radial, star and tapered styrene-isoprene block copolymers available under the trade designation KRATON from Shell Chemical Co. of Houston, Tex. and EUROPRENE from EniChem Elastomers Americas, Inc. of Houston, Tex.; linear styrene-(ethylene-butylene) block copolymers, linear styrene-(ethylene-propylene) block copolymers, and linear, radial, and star styrene-butadiene block copolymers, each available under the trade designation KRATON from Shell Chemical Co. of Houston, Tex.; polyetheresters such as HYTREL, available from E. I. du Pont de Nemours and Company of Wilmington, Del.; and polyolefin-based thermoplastic elastomeric materials such as those represented by the formula—($CH_2$—CHR), where R is an alkyl group containing 2 to 10 carbon atoms and polyolefins based on metallocene catalysis available under the trade designation ENGAGE, an ethylene/polyolefin copolymer available from Dow Plastics Co. of Midland, Mich.; natural rubbers such as CV-60, a controlled viscosity grade, and SMR-5; butyl rubbers; synthetic polyisoprenes available under the trade designation CARIFLEX, available from Royal Dutch Shell of Netherlands and NATSYN, from Goodyear Tire and Rubber Co. of Akron, Ohio; ethylene-propylenes; polybutadienes; polyisobutylenes available under the trade designation VISTANEX, from Exxon Chemical Co. of Houston, Tex.; and styrene-butadiene random copolymer rubbers available under the trade designation AMERIPOL, from BF Goodrich of Akron, Ohio.

Pressure sensitive adhesives can optionally include one or more tackifiers. Useful tackifiers for acrylic polymers include rosin esters such as FORAL 85 from Hercules, Inc. of Wilmington, Del., aromatic resins such as PICCOTEX LC-55WK from Hercules, Inc. of Wilmington, Del., and aliphatic resins such as ESCOREZ 13 from Exxon Chemical Co. of Houston, Tex. Tackifiers, if present, typically comprise from about 5 to 75 percent by weight of the pressure sensitive adhesive. The pressure sensitive adhesive may be crosslinked or non-crosslinked.

Figure 2:
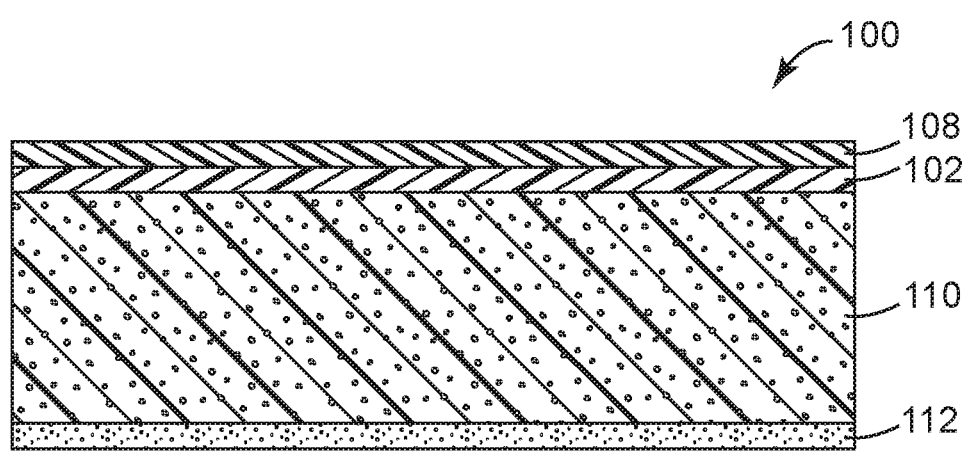
FIG. 2 is an elevational cross-sectional view of the adhesive article of FIG. 1 with its layers collapsed.

FIG. 2 shows the adhesive article 100 as assembled. As shown in the figure, the heat-bondable layer 108, barrier layer 102, backing 110, and adhesive layer 112 represent a stacked configuration where each layer continuously extends across and directly contacts the layer next to it. Optionally, but not shown, at least some of the layers do not continuously extend across its adjacent layer. For example, the adhesive layer 112 could be modified to be a patterned layer where the adhesive layer 112 extends over and contacts only a portion of the adjacent backing 110.

As a further option, the coupling between adjacent layers of the adhesive article 100 may be mechanically or chemically enhanced. This could include, for example, roughening the mating surfaces, incorporating interlocking features, and/or using surface modification techniques such as corona, flame plasma, or electron beam treatment to improve wetting at the interface.

One or more additional layers may be coated or laminated to either exposed surface of the adhesive article 100. Provided that the integrity of the overall adhesive article 100 is not unduly compromised, one or more intermediate layers may be interposed between any two adjacent layers present in the adhesive article 100. Such layer or layers may be similar to those described above or may be structurally or chemically distinct. Distinct layers could include, for example, extruded sheets of a different polymer, metal vapor coatings, printed graphics, particles, and primers. These additional layers may be continuous or discontinuous. In FIG. 2, for example, a tie layer may be disposed between the backing 110 and the adhesive layer 112 to improve adhesion between the two layers.

The adhesive article 100 can be advantageously used in a wide variety of bonding applications where a bonding surface may come into contact with a plasticizer. These include, for example, taped seal applications for permanently attaching rubber seals to the exterior surfaces of vehicles. This can provide a significant weight reduction compared with mechanical crimp-on seals known in the art.

These seals, which can be made from EPDM or other plasticized polymers, are exposed to harsh outdoor environments, such as intense sun exposure and temperatures exceeding 90° C. Under these conditions, plasticizer contained within in the rubber seal tends to migrate or diffuse out of the rubber and into conventional adhesive articles that bond them to the vehicle. The adhesive article 100 overcomes this problem by blocking the plasticizer immediately adjacent to the bonding interface to avoid weakening the rubber seal and plasticizing the tape backing and adhesive layers.

Figure 3:
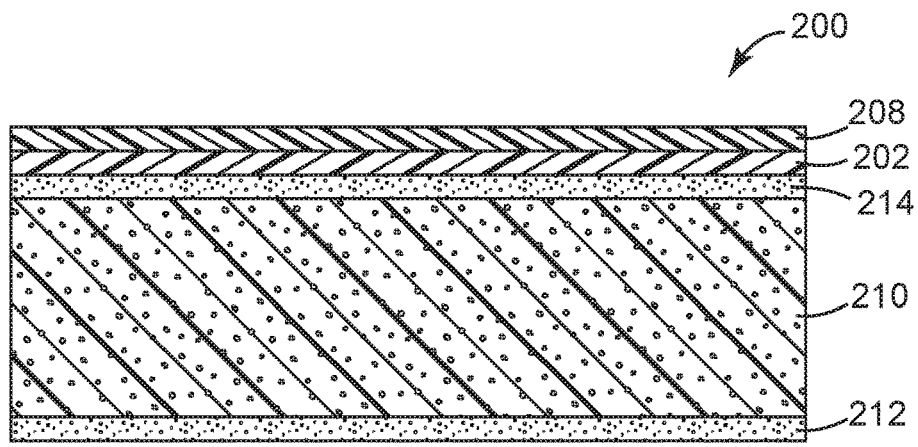
FIG. 3 is an elevational cross-sectional view of an adhesive article according to a second exemplary embodiment.

FIG. 3 shows an adhesive article 200 according to another exemplary embodiment. As shown, adhesive article 200 includes layers that are analogous, in structure and composition, to those of adhesive article 100—particularly, the heat-bondable layer 208, barrier layer 202, backing 210, and adhesive layer 212. Unlike the adhesive article 100, however, the adhesive article 200 includes a second adhesive layer 214 disposed between the barrier layer 202 and backing 210 that adhesively couples these layers to each other.

In a preferred embodiment, the second adhesive layer 214 is a pressure sensitive layer having any of the compositional and structural characteristics described previously with respect to the adhesive layer 112. Optionally, the second adhesive layer 214 is similar or identical to the adhesive layer 212. In other embodiments, the second adhesive layer 214 is not a pressure sensitive adhesive. For example, the second adhesive layer 214 can be a hot melt adhesive or a polymer resin that functions as an adhesive when it is cured or otherwise hardened by heat, moisture, or radiation.

The inclusion of the second adhesive layer 214 can be beneficial where the nature of the barrier layer 202 and/or the backing 210 prevents, or unduly complicates, heat laminating these layers to each other.

Figure 4:
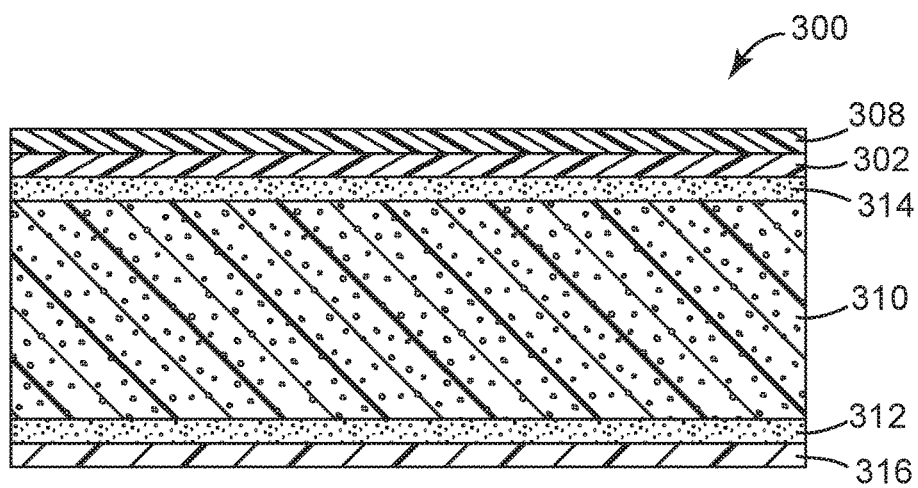
FIG. 4 is an elevational cross-sectional view of an adhesive article according to a third exemplary embodiment.

FIG. 4 shows an adhesive article 300 according to yet another embodiment. The adhesive article 300 has a layered configuration analogous to that of adhesive article 200 (having a heat-bondable layer 308, barrier layer 302, backing 310, and first and second adhesive layers 312, 314), but further includes a support layer 316 extending across and releasably coupled to the first adhesive layer 312, as illustrated. In the finished adhesive article 300, the support layer 316 is a disposable liner that is manually stripped off and discarded before the adhesive article 300 is used. The support layer 316 protects the exposed surface of the first adhesive layer 312 for packaging purposes, but may also provide a benefit by adding strength to the overall adhesive article 300.

Figure 5:
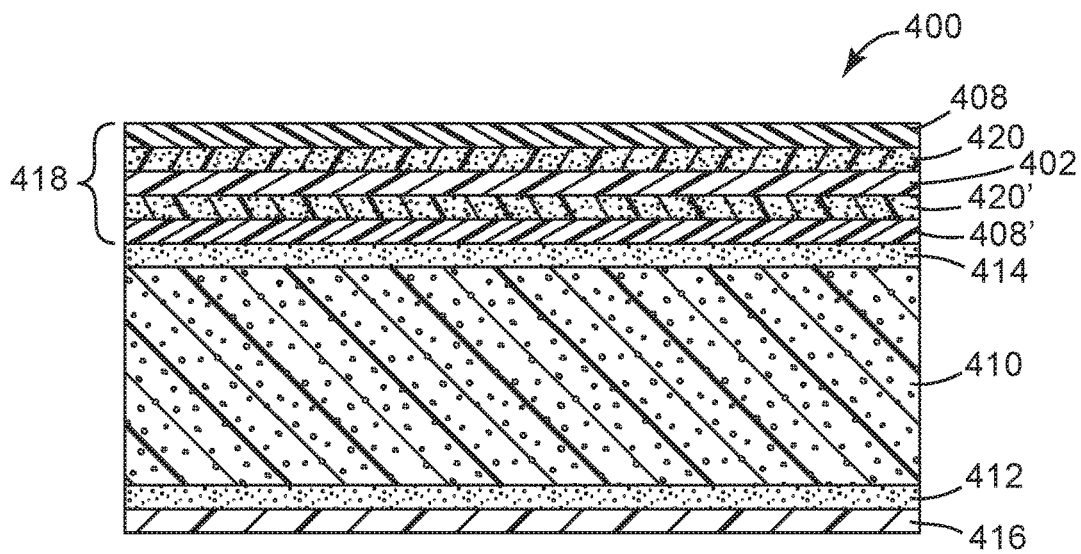
FIG. 5 is an elevational cross-sectional view of an adhesive article according to a fourth exemplary embodiment.

FIG. 5 shows a fourth embodiment of the adhesive article 400 that employs a symmetric five-layer melt blown composite film 418 as a heat-sealable barrier. As shown in this figure, the composite film 418 includes a core barrier layer 402, a pair of tie layers 420, 420' extending across, and contacting, each major surface of the barrier layer 402. Disposed onto and contacting the outward-facing surfaces of the tie layers 420, 420' are a pair of heat-bondable layers 408, 408'. Characteristics of the remaining layers of the adhesive article 400 are similar to those described with respect to the adhesive articles 100, 200, 300 and shall not be repeated here.

Advantageously, the tie layers 420, 420' improve adhesion between a polar-group-containing barrier layer 402 (e.g. EVOH) and respective heat-bondable layers 408, 408'. This may be especially beneficial, for example, where the heat-bondable layers 408, 408' are olefinic. In some embodiments, the composite film 418 may further include slip adds on the peripheral surfaces of the heat-bondable layers 408 to facilitate smooth extrusion of the composite film 418 components through the die in a coextrusion process, such as a blown film process.

Each of tie layers 420 functions as an adhesive which binds the heat-bondable layers 408 to the barrier layer 402. The tie layer may be formed by grafting at least one polymerizable ethylenically unsaturated monomer to a material which is chemically similar to the adjacent heat-bondable layer 408 to form a graft copolymer. This can enables improved compatibility and wetting of the tie layer 420 to the heat bondable layer 408. If the heat bondable layer 408 is polyethylene, for example, the tie layer 420 could be made from a graft copolymer of polyethylene and a polymerizable ethylenically unsaturated monomer. Exemplary polymerizable ethylenically unsaturated monomers include maleic acid, maleic anhydride, acrylic acid, alkyl acrylate esters, methacrylic acid, alkyl methacrylate esters, itaconic acid, citraconic acid, mesaconic acid, 4-methyl cyclohexene-1,2-dicarboxylic acid anhydride. Commercially available materials that may be used in the tie layers 420 include, for example, graft copolymers derived from polyolefin and maleic anhydride and sold under the trade designation ADMER, from Mitsui Chemicals of Tokyo, Japan.

In some embodiments, the major surface of the heat-bondable layer 408' facing away from the barrier layer 402 may be chemically modified to improve its adhesion to adhesive layer 414 in the finished product. Such surface modification may be achieved, for example, by air corona discharge treatment. As an alternative, nitrogen corona, plasma treatment, or even use of chemical primers may be employed for the same purpose.

The multi-layered configuration of FIG. 5 can be advantageous when using hygroscopic materials such as EVOH as a barrier layer because it prevents moisture in humid environments from impinging on the major surfaces of the barrier layer. Absorbed moisture is often detrimental because it can significantly degrade the barrier properties of EVOH and similar polymers. The symmetric layer construction shown is also well suited to existing industrial blown film manufacturing methods.

The provided adhesive articles preferably display high strength and robustness under high static loads. Further, these properties should be preserved even when these articles are used to bond plasticized rubber seals to various substrates. In automotive original equipment manufacturer (OEM) testing, these bonds should be capable of withstanding many years of service. Such performance can be measured on an accelerated time scale through heat aging. For example, adhesive articles can be exposed to a temperature of 90 degrees Celsius for 10 days or more. This can be carried out either on liners to simulate parts in storage or after bonding to a test panel to simulate actual use. In these tests, the provided adhesive articles were observed to show bond performance that was superior compared with conventional taped seals.

Adhesive articles provided herein are preferably capable of being significantly stretched along their plane while retaining the plasticizer-blocking properties of the barrier layer. In some embodiments, the adhesive article is capable of being uniaxially stretched to an overall elongation of at least 10 percent, at least 20 percent, at least 30 percent, at least 40 percent, at least 50 percent, at least 60 percent, at least 70 percent, at least 80 percent, at least 90 percent, or at least 100 percent, with the barrier layer continuing to be substantially impermeable to oxygen gas at ambient temperature and pressure. Advantageously, the use of a blown film extrusion process to embed EVOH within a pair of symmetrically disposed, heat-bondable, polyolefin layers provides a barrier layer that can significantly stretch and deform without compromising its barrier properties.

Further particular embodiments 1-21 of the provided adhesive articles are enumerated below. Notably, this list is not exhaustive.

1. An adhesive article comprising: a barrier layer having opposed first and second major surfaces, the barrier layer being substantially impermeable to oxygen gas at ambient temperature and pressure; a heat-bondable layer extending across and coupled to the first major surface of the barrier layer; a backing extending across and coupled to the second major surface of the barrier layer; and an adhesive layer extending across and coupled to the backing opposite the barrier layer.

2. An adhesive article comprising: a barrier layer having opposed first and second major surfaces, wherein the barrier layer is heat-bondable and substantially impermeable to oxygen gas at ambient temperature and pressure; a backing extending across and coupled to the second major surface of the barrier layer; and an adhesive layer extending across and coupled to the backing opposite the barrier layer.

3. The adhesive article of embodiment 1 or 2, further comprising a liner extending across and contacting a major surface of the adhesive layer opposite the backing.

4. The adhesive article of any one of embodiments 1-3, wherein the adhesive layer is a first adhesive layer and further comprising a second adhesive layer coupling the barrier layer and the backing to each other.

5. The adhesive article of any one of embodiments 1-4, wherein each adhesive layer is a pressure sensitive adhesive layer.

6. The adhesive article of embodiment 1, further comprising a first tie layer contacting the heat-bondable layer and disposed between the heat-bondable layer and the first major surface of the barrier layer.

7. The adhesive article of embodiment 6, further comprising a second tie layer contacting the barrier layer and disposed between the second major surface of the barrier layer and the backing.

8. The adhesive article of embodiment 7, further comprising a second heat-bondable layer contacting the second tie layer and disposed between the second tie layer and the backing.

9. The adhesive article of embodiment 8, wherein the second heat-bondable layer has a certain major surface facing away from the barrier layer, the certain major surface being corona discharge modified.

10. The adhesive article of any one of embodiments 6-9, wherein at least one tie layer comprises a graft copolymer of a polyolefin and an ethylenically unsaturated monomer.

11. The adhesive article of embodiment 10, wherein the ethylenically unsaturated monomer comprises maleic anhydride.

12. The adhesive article of any one of embodiments 1 and 6-11, wherein the barrier layer comprises a polar-group-containing polymer.

13. The adhesive article of embodiment 12, wherein the polar-group-containing polymer is ethylene vinyl alcohol copolymer.

14. The adhesive article of embodiment 12, wherein the polar-group-containing polymer is an ionomer.

15. The adhesive article of any one of embodiments 1-11, wherein the barrier layer comprises a crosslinked polymer network.

16. The adhesive article of any one of embodiments 1-11, wherein the barrier layer comprises a polymer composite that includes a flake filler preferentially oriented parallel to the first and second major surfaces.

17. The adhesive article of embodiment 1, wherein the heat-bondable layer comprises a polyolefin.

18. The adhesive article of embodiment 17, wherein the polyolefin is linear low density polyethylene.

19. The adhesive article of embodiment 18, wherein the heat-bondable layer comprises a copolymer of linear low density polyethylene and octene.

20. The adhesive article of any one of embodiments 1-19, wherein the backing is a compressible backing.

21. The adhesive article of embodiment 20, wherein the compressible backing comprises a foam.

22. The adhesive article of embodiment 21, wherein the foam is a closed-cell foam.

23. A bondable seal comprising:
   a plasticized rubber seal; and
   the adhesive article of any one of embodiments 1-22, wherein the adhesive article is bonded to the plasticized rubber seal.

24. A method of making an adhesive article comprising:
   embedding a barrier layer between a pair of heat-bondable polymeric layers by coextrusion, wherein the barrier film is substantially impermeable to oxygen gas at ambient temperature and pressure;
   coupling one of the heat-bondable layers to a first major surface of a backing; and
   coupling an adhesive layer to a second major surface of the backing opposite the first major surface.

25. The method of embodiment 24, wherein the barrier layer comprises ethylene vinyl alcohol copolymer.

26. The method of embodiment 24 or 25 wherein each of the heat-bondable polymeric layers comprise linear low density polyethylene.

Objects and advantages of this disclosure are further illustrated by the following non-limiting examples, but the particular materials and amounts thereof recited in these examples, as well as other conditions and details, should not be construed to unduly limit this disclosure.

EXAMPLES

Objects and advantages of this disclosure are illustrated by the following non-limiting examples. Particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

The following abbreviations are used to describe the examples:
° C.: degrees Centigrade
cm: centimeters
cm/min: centimeters per minute
h: hour
kPa: kilopascals
m: meter
m/min: meters per minute
mm: millimeter
mm/min: millimeters per minute
N/cm: newtons per centimeter Test Methods
Rubber to Paint Peel Test Example 1 and Comparative C1 were laminated to a flat EPDM rubber stock (3.2 cm width by 3.2 mm thickness), available from Lauren Manufacturing, Philadelphia, Ohio, as Lauren Part Number 102997-00, to simulate an EPDM weatherstrip using a laboratory Straub WL-30 continuous hot air laminator obtained from Straub Design Company of Minneapolis, Minn. The rubber stock was first cleaned off-line by a heptane solvent wipe. The rubber was then placed on the conveyor track of the laminator. The heat-bond film side of the test tape, which was slit to a width of 12.5 mm, was then brought into contact with the approximate center of the cleaned side of the rubber. This was carried out using an unwind system at a rate of about 7.5 m/minute within a stream of air heated to approximately 650° C. and directed at the film-rubber interface from a hot air gun. The speed and heat settings of the laminator were optimized to melt the rubber and heat bond film together to produce a bond between the two substrates. The resulting laminate was then immediately conveyed under an in-line roller which was calibrated to apply about 100 kPa of pressure to the bond line while the tape-rubber interface was still hot. The quality of the tape-rubber bond was manually tested by peeling the laminate at room temperature using an aluminum strip applied to the PSA side of the tape. An acceptable bond was one in which the heat-bond film-rubber interface remains intact after peeling (i.e., the failure occurred elsewhere in the tape, for example, by a foam split).

The rubber/tape laminates were then bonded to 10.2 cm width by 30.5 cm length clear-coated paint panels (obtained from ACT of Detroit, Mich.). Two clear-coats were used for the testing; a carbamate based composition (R10CG060X, made by BASF, Detroit, Mich.) and a 2-component urethane based clear-coat (RK8211, made by Axalta Coating Systems, Philadelphia, Pa.).

The following test protocol was used. Teflon tape, 2.54 cm wide, was first applied across the narrow ends of the paint panels. Two rubber strips, one of each tape and rubber laminate composition, were bonded lengthwise to the panel, so that the ends of each strip extended about 2.54 cm past the end of the paint panel. The liner was left intact on this overhanging strip of rubber. This strip, plus the 2.54 cm wide Teflon tape allowed about 5 cm of the taped rubber specimen to be gripped in the jaws of a tensile testing machine set up in a 90 degree peel configuration. The rubber stock was peeled from each end of the paint panel. Under the programmed test condition, a portion of the peel test was conducted at 13 mm/minute for 3.8 cm, the test was paused, and then peeling restarted at 305 mm/minute for 12.7 cm. Two replicates were run for each sample. Aging conditions for samples were 240 hours at 70° C. or 240 hours at 90° C. The results are reported in newtons per cm and shown in Table 1 (peel speed: 13 mm/min) and Table 2 (peel speed: 305 mm/min) below for initial and aged conditions.

Materials
Adhesive articles were prepared using the following components and techniques provided below.

Heat Bondable/Barrier Layer
A seven layer coextruded blown film consisting of the following layers; LLDPE (octene-based with slip and anti-block additives)/LLDPE (octene-based)/tie layer/EVOH/tie layer/LLDPE (octene-based)/LLDPE (octene-based with slip and anti-block additives) having a thickness of 0.06 mm, was obtained from Bemis Company of Neenah, Wis., having a thickness of 0.06 mm. The film was air corona treated on one side. The EVOH (ethylene-vinyl-alcohol polymer) in the middle layer of the film served as the barrier layer.

Backing Layers
A pressure sensitive adhesive coated foam obtained from 3M Company of St. Paul, Minn. under the designation Acrylic Plus Weatherstrip Tape WT4112 having an olefin-based heat bondable layer laminated thereon. For barrier film testing in comparison to the standard, WT4112 made without the standard heat-bondable layer was used as a backing to which the barrier film was laminated to the non-liner side.

Example 1

The foam tape composition of WT4112 was used as received, except with the air-corona-treated side of the multi-layer heat-bondable barrier film laminated to the non-liner side. The lamination was carried out manually using a rubber roller and hand pressure. The laminated construction was allowed to dwell for a minimum of 72 hours to allow adhesion to build between the barrier film and the backing.
Comparative C1
WT4112 was used as manufactured with the heat bondable layer in place.

TABLE 1

(peel speed: 13 mm/min)

| Example/Comparative | Clear Coat | Peel test result (N/cm) | | |
|---|---|---|---|---|
| | | Initial | 240 h, 70° C. | 240 h, 90° C. |
| 1 | R10CG060X | 24.82 | 28.21 | 28.70 |
| 1 | RK8221 | 23.17 | 26.64 | 24.68 |
| C1 | R10CG060X | 23.94 | 26.74 | 25.34 |
| C1 | RK8221 | 23.24 | 21.24 | 24.29 |

TABLE 2

(peel speed: 305 mm/min)

| Example/Comparative | Clear Coat | Peel force (N/cm) | | |
|---|---|---|---|---|
| | | Initial | 240 h, 70° C. | 240 h, 90° C. |
| 1 | R10CG060X | 57.96 | 56.74 | 53.41 |
| 1 | RK8221 | 49.67 | 50.37 | 53.45 |
| C1 | R10CG060X | 54.18 | 44.84 | 42.42 |
| C1 | RK8221 | 53.90 | 47.29 | 49.84 |

All patents and patent applications mentioned above are hereby expressly incorporated by reference. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An adhesive article comprising:
    a barrier layer having opposed first and second major surfaces, the barrier layer being substantially impermeable to oxygen gas at ambient temperature and pressure;
    a heat-bondable layer extending across and coupled to the first major surface of the barrier layer;
    a polymeric foam backing extending across and coupled to the second major surface of the barrier layer; and
    a pressure sensitive adhesive layer extending across and coupled to the backing opposite the barrier layer.

2. The adhesive article of claim 1, further comprising a liner extending across and contacting a major surface of the adhesive layer opposite the backing.

3. The adhesive article of claim 1, wherein the barrier layer comprises a polar-group-containing polymer.

4. The adhesive article of claim 3, wherein the polar-group-containing polymer is ethylene vinyl alcohol copolymer.

5. The adhesive article of claim 3, wherein the polar-group-containing polymer is an ionomer.

6. The adhesive article of claim 1, wherein the barrier layer comprises a crosslinked polymer network.

7. The adhesive article of claim 1, wherein the heat-bondable layer comprises a linear low density polyethylene.

8. The adhesive article of claim 7, wherein the heat-bondable layer comprises a copolymer of linear low density polyethylene and octene.

9. A method of making an adhesive article comprising:
    embedding a barrier layer between a a first and a second heat-bondable polymeric layers by coextrusion, wherein the barrier layer has opposed first and second major surfaces and is substantially impermeable to oxygen gas at ambient temperature and pressure; and wherein the first heat-bondable polymeric layer extends across and is coupled to the first major surface of the barrier layer;
    coupling one of the heat-bondable layers to a first major surface of a polymeric foam backing; wherein the polymeric foam backing extends across and is coupled to the second major surface of the barrier layer and
    coupling a pressure sensitive adhesive layer extends across and is coupled to the second major surface of the backing opposite the first major surface.

* * * * *